(12) United States Patent
Auxerre

(10) Patent No.: US 6,463,975 B1
(45) Date of Patent: *Oct. 15, 2002

(54) TIRE WITH AT LEAST TWO ANCHORING BEAD WIRES AND AT LEAST ONE PLY OF CIRCUMFERENTIAL REINFORCEMENT ELEMENTS IN EACH BEAD

(75) Inventor: Pascal Auxerre, Royat (FR)

(73) Assignee: Compagnie Generale des Etablissements Michelin-Michelin & Cie, Clermont-Ferrand Cedex (FR)

( * ) Notice: Subject to any disclaimer, the term of this patent is extended or adjusted under 35 U.S.C. 154(b) by 131 days.

This patent is subject to a terminal disclaimer.

(21) Appl. No.: 09/614,627

(22) Filed: Jul. 12, 2000

Related U.S. Application Data

(63) Continuation of application No. PCT/EP98/08264, filed on Dec. 16, 1998.

(30) Foreign Application Priority Data

Jan. 12, 1998 (FR) .............................................. 98 00291

(51) Int. Cl.[7] .......................... B60C 3/04; B60C 15/00; B60C 15/04; B60C 15/05; B60C 15/06

(52) U.S. Cl. ........................ 152/454; 152/539; 152/540; 152/542; 152/543; 152/545; 152/550; 152/552

(58) Field of Search ................................ 152/545, 454, 152/552, 539, 542, 543, 540, 550

(56) References Cited

U.S. PATENT DOCUMENTS 3,301,303 A    1/1967   Travers

FOREIGN PATENT DOCUMENTS

| FR | 1234995 | 5/1960 |
| FR | 1327810 | 4/1963 |
| FR | 2055988 | 5/1971 |

*Primary Examiner*—Adrienne C. Johnstone
(74) *Attorney, Agent, or Firm*—Baker Botts L.L.P.

(57) ABSTRACT

A tire, at least one radial carcass reinforcement of which is anchored within each bead B to two bead wires and to form an upturn, characterized in that, viewed in meridian section, an additional reinforcement armature, formed of at least one ply of circumferential reinforcement elements, is placed, at least axially to the inside, along the carcass reinforcement in the region of the bead B.

11 Claims, 4 Drawing Sheets

TIRE WITH AT LEAST TWO ANCHORING BEAD WIRES AND AT LEAST ONE PLY OF CIRCUMFERENTIAL REINFORCEMENT ELEMENTS IN EACH BEAD

This is a continuation of PCT/EP98/08264, filed Dec. 16, 1998.

BACKGROUND OF INVENTION

The present invention relates to a tire with radial carcass reinforcement which is intended to bear heavy loads, and more particularly to a "heavy-vehicle"-type tire, intended to be fitted on vehicles such as, for example, lorries, road tractors, buses, trailers and others, and more particularly to the novel reinforcement structure for the beads of said tire.

Generally, a tire of the type in question comprises a carcass reinforcement formed of at least one ply of metal cables, which is anchored in each bead to a bead wire, forming an upturn. The carcass reinforcement is radially surmounted by a crown reinforcement, composed of at least two plies of metal cables which are crossed from one ply to the next, forming angles of between 10° and 45° with the circumferential direction. The carcass reinforcement upturns are generally reinforced by at least one bead reinforcement ply formed of metal cables which are oriented at a small angle relative to the circumferential direction, generally of between 10° and 30°.

The bead reinforcement ply is generally located axially to the outside, along the carcass reinforcement upturn, with a radially upper end located above or below the radially upper end of the carcass reinforcement upturn. As for the radially lower end of such a reinforcement ply, it is generally located beneath a straight line parallel to the axis of rotation and passing approximately through the center of gravity of the meridian section of the anchoring bead wire of the carcass reinforcement.

The known solution aims to avoid deradialization of the cables of the carcass reinforcement upturn and to minimize the radial and circumferential deformations to which the end of said upturn and the outer rubber layer covering the bead and providing the connection to the rim are subjected.

The life of "heavy-vehicle" tires, owing to the progress achieved, and to the fact that certain types of travel are made less of a handicap as far as wear of the tread is concerned, has become such that it is also necessary to improve the endurance of the beads. Said improvement must focus on the degradation of the rubber layers at the level of the ends of the carcass reinforcement upturn and the radially outer ends of the bead reinforcement plies. More particularly in the case of tires which are subject to prolonged travel, which travel frequently induces a high temperature of the beads, owing to the temperatures which the mounting rims reach, the rubber mixes in contact with the rim are then subject to a reduction in their rigidity, and to more or less slow oxidation, hence the very marked tendency of the carcass reinforcement to unwind from around the bead wire under the action of the internal inflation pressure, despite the presence of one or more bead reinforcement plies. There then arise bead wire movements and shearing deformations at all the ends of the plies, resulting in the destruction of the bead. Said improvement must also, and primarily, focus on this second possibility of degradation.

U.S. Pat. No. 3,301,303, in order to improve the endurance of the bead zone of a tire bearing heavy loads, claims a carcass reinforcement which is wound in a precise trace around two bead wires which are practically axially adjacent: the carcass reinforcement is first anchored by turning up about the axially innermost bead wire, passing radially from the outside to the inside, then axially from the inside to the outside, then passing radially below the second bead wire, which is arranged axially to the outside, to wind about said second bead wire, passing radially from the inside to the outside then axially from the outside to the inside to form an upturn which comes back radially beneath the first bead and possibly winds around said bead wire to then be arranged along the axially outer face of the carcass ply.

The carcass reinforcement of a radial tire, mounted on its operating rim and inflated to the recommended pressure, has in one sidewall a regularly convex meridian profile between approximately the zones of connection firstly with the meridian profile of the crown reinforcement and secondly with the bead. In particular, starting from the radius where the carcass reinforcement is subject to the influence of the bead reinforcement plies, said reinforcement has in the bead a meridian profile which is either substantially rectilinear or curved in the opposite direction to the curvature in the sidewalls, that is to say, substantially parallel to the curvature of the rim flanges starting from a point of inflection located radially approximately at the level of the radially upper end of the bead reinforcement ply placed along the carcass reinforcement upturn.

Such an arrangement associating two bead wires within a bead with a meridian profile having a point of inflection in the region of the bead significantly improves the endurance of the beads in the case of travel on a heated rim, but becomes insufficient, however, in the case of travel where the supported loads become greater, or the inflation pressures less, than the recommended loads and pressures, and more particularly when the ratio of the height H on rim to the maximum axial width S of the tire becomes less than 0.8.

Research has led to the conclusion that the meridian profile of the carcass reinforcement in the region of the change of curvature within the bead needed to be reinforced by at least one bead reinforcement armature.

SUMMARY OF THE INVENTION

In order to improve the endurance of the beads of a tire having an H/S form ratio of less than 0.8, intended to be fitted on a vehicle bearing heavy loads, said tire, according to the invention, comprises at least one radial carcass reinforcement, formed of at least one ply of inextensible reinforcement elements, anchored within each bead B to at least two bead wires which are close to each other, which is turned up about the first and then wound around the second to form an upturn, and it is characterized in that, viewed in meridian section, an additional reinforcement armature, formed of at least one ply of circumferential reinforcement elements, is placed along the carcass reinforcement, at least axially to the inside, in the bead region where the trace of the meridian profile of said carcass reinforcement changes curvature to become rectilinear or concave at the point of tangency T with the virtually circular coating layer of the first anchoring bead wire, said reinforcement armature having its radially lower end radially beneath the straight line D' which is parallel to the axis of rotation and passes through that point of the coating layer of the first anchoring bead wire which is radially farthest from the axis of rotation, but above the straight line D which is parallel to the axis of rotation and passes through that point of the coating layer of the first anchoring bead wire which is radially closest to the axis of rotation.

The additional reinforcement armature will preferably have its radially upper end located at a radial distance from the straight line D which lies between a quantity equal to half the radial distance between the straight lines D and D" increased by half the radial distance between the straight lines D and D' and a quantity equal to half the radial distance between the straight lines D and D" reduced by half the radial distance between the straight lines D and D' , the straight line D" being the straight line at the point of greatest axial width.

The straight line D" at the point of greatest axial width is, by definition, the straight line parallel to the axis of rotation and passing through that point in the meridian profile of the carcass reinforcement which corresponds to the point of greatest axial width when the tire is mounted on its operating rim and inflated to the recommended, non-loaded pressure.

The elements of the additional reinforcement armature are said to be circumferential if the angle which they form with the circumferential direction is between +5° and −5°.

Whatever the path which the carcass reinforcement follows in its anchoring to the two bead wires, for example the trace as described in U.S. Pat. No. 3,301,303 and defined above, or alternatively a trace defined by a first upturn about the bead wire axially farthest to the inside, going from the inside to the outside, then passing axially between the two bead wires to be radially above the axially outermost bead wire, then to turn up about said bead wire, going radially from the top to the bottom and axially from the outside to the inside, and then being located radially below the innermost bead wire, it is advantageous for the end of the upturn to be located radially beneath the axially innermost bead wire.

One advantageous modification of the bead thus obtained resides in the fact that the straight line joining the two centers of gravity of the cross-sections of bead wires is no longer parallel to the axis of rotation, but forms with the latter an angle $\beta$, which is open axially and radially to the outside, of between 20° and 60°.

This structure thus permits partial takeup of the meridian tensile forces to which the carcass reinforcement is subjected, and thus minimizes the possible deformations of the carcass reinforcement upturn, whatever the conditions of travel.

The takeup of the forces will be all the greater the greater the number of reinforcement elements of the additional armature; they will preferably be metal, made of steel, which are adjoining over the entire length of the reinforcement ply. Reinforcement elements are said to be adjoining if, in the direction perpendicular to said elements, the distance between two adjacent elements is reduced as much as possible.

The takeup of the meridian tensile forces of a carcass reinforcement is known per se from numerous documents. French Patent 750 726 teaches gluing carcass reinforcement plies to auxiliary reinforcements, each formed of a cord wound in a spiral and consequently having significant flexibility in the transverse direction. Said gluing is effected such that two carcass reinforcement plies tightly surround an auxiliary reinforcement, this surrounding being in the absence of a bead wire and a carcass reinforcement upturn.

French Patent 1 169 474 also teaches dispensing with the bead wire usually used by small plies of metal cords or cables inclined on the parallel hooking line, the angle of inclination possibly being as low as 5°, the carcass reinforcement ply (plies) being turned up or not turned up.

French Patent 1 234 995 provides for the replacement of the usually oblique reinforcement elements of the bead reinforcement ply (plies) which is (are) intended to reduce the movements of hooking against the rim flange with circumferential elements, the reinforcement armature possibly being arranged between the main part of the carcass reinforcement and the upturn of said reinforcement, or axially to the outside of said carcass reinforcement upturn.

The same bead reinforcement armatures with circumferential elements are found in French Patent 1 256 432, said elements being intended to take up the tensile forces of the carcass reinforcement in their entirety, and in the case of tires for passenger vehicles, in the absence of anchoring bead wires or any other reinforcement ply.

FR 2 055 988 describes a certain number of possible applications of a bead reinforcement armature having circumferential elements, in particular the use of such an armature in the place of the conventional armature having oblique elements which are arranged axially to the outside of the carcass reinforcement upturn.

The problems of endurance referred to above, which are influenced by the operating temperature of the beads, have been solved to a very slight degree by what is called a "thinned" bead structure, obtained, for example, by the means described in French Patent 2 451 016 which, to this end, teaches to impart a relatively great concavity to the outer sidewall of the tire, between the point where said sidewall is no longer in contact with the rim and the point where said sidewall achieves its maximum distance relative to the equatorial plane, when the tire is mounted on its operating rim and inflated to the recommended pressure.

The carcass reinforcement, in order to reduce the volume of the beads as far as possible, is advantageously formed of reinforcement elements of textile material, which makes it possible to produce the reinforcement windings around the bead wires easily. However, sometimes, for various reasons, the presence of a metal carcass reinforcement is required, in particular in the regions of the crown and sidewalls of the tire. One preferred solution of the invention then consists in providing said tire with a carcass reinforcement made of three parts: a first part consisting of metal reinforcement elements passing at least beneath the crown reinforcement and into the sidewalls, and two other parts, formed of textile reinforcement elements, which are turned up and wound around the two anchoring bead wires of each bead. The edges of the metal part, which part may or may not be turned up about the anchoring bead wires, have with the axially inner edges of the textile parts a common overlap length, at least located in the region in which the additional armature of circumferential reinforcement elements is located.

The endurance of the beads according to the invention may also be improved by thinning said beads, imparting to the carcass reinforcement anchored to two bead wires within a bead a meridian profile which does not have any change in curvature in the region of the beads. Said meridian profile is then characterized in that, viewed in meridian section, its trace, between the point A of greatest axial width and the point of tangency T with the virtually circular coating layer of the first anchoring bead wire, is convex and circular over its entire length, the center of curvature being located on the straight line D" , of greatest axial width, such that the thickness s of the bead B, measured on a line perpendicular to said meridian profile at a point C of height $h_c$ of between 30 and 40 mm and measured relative to the base of the bead YY', is between 2 and 2.5 times the thickness e of the sidewall measured on the straight line D" of greatest axial width.

Not only does the combination of the presence of two anchoring bead wires per bead with the presence of a bead reinforcement armature, having circumferential elements, and arranged, according to the invention, within the main part of the carcass reinforcement, permit improvement of the endurance of the beads, but furthermore, in combination with the entirely convex meridian profile of the carcass reinforcement described above, it makes it possible to obtain a very significant reduction in the weight of the tire, while not adversely affecting its properties. Said reduction in weight may be advantageously accentuated by the replacement of the bead wires having rectangular metal wires, which are generally used in the type of tire in question, by more economical bead wires of "braided" type, that is to say, formed of a helicoidal braiding of a plurality of metal wires, or bead wires of the "stack" type of polygonal section, that is to say bead wires obtained by winding a metal wire on a form, which results in a plurality of layers of different widths. The types of bead wire above furthermore mean that less space is taken up, owing to the shape of their cross-sections and to the possible reduction of said sections, of the order of 30% and 50% for each, respectively, which, relative to the application of the invention to the case of bead wires with rectangular wires, which take up more space, results in a thinner bead thickness.

The bead reinforcement armature thus described may be produced separately by spiral winding on a horizontal support of suitable shape, and then be transferred to the non-vulcanized tire blank. The manufacture of such a tire will however be advantageously facilitated by the use as reinforcement elements of lengths or assemblies or groups of lengths of cables of a circumferential length of between 0.2 and 0.4 times the circumferential length of the reinforcement ply, which permits laying of the bead reinforcement armature on the building drum for the raw blank of the carcass reinforcement and the shaping of said blank into a torus without major difficulties, and said average length being measured upon laying on said building drum. The circumferential gaps or cuts between cut elements will preferably be offset from each other.

DESCRIPTION OF THE DRAWINGS

The characteristics of the invention will be better understood with reference to the following description, which refers to the drawings, which illustrate examples of embodiments in non-limitative manner, and in which.

DESCRIPTION OF PREFERRED EMBODIMENTS

Figure 1:
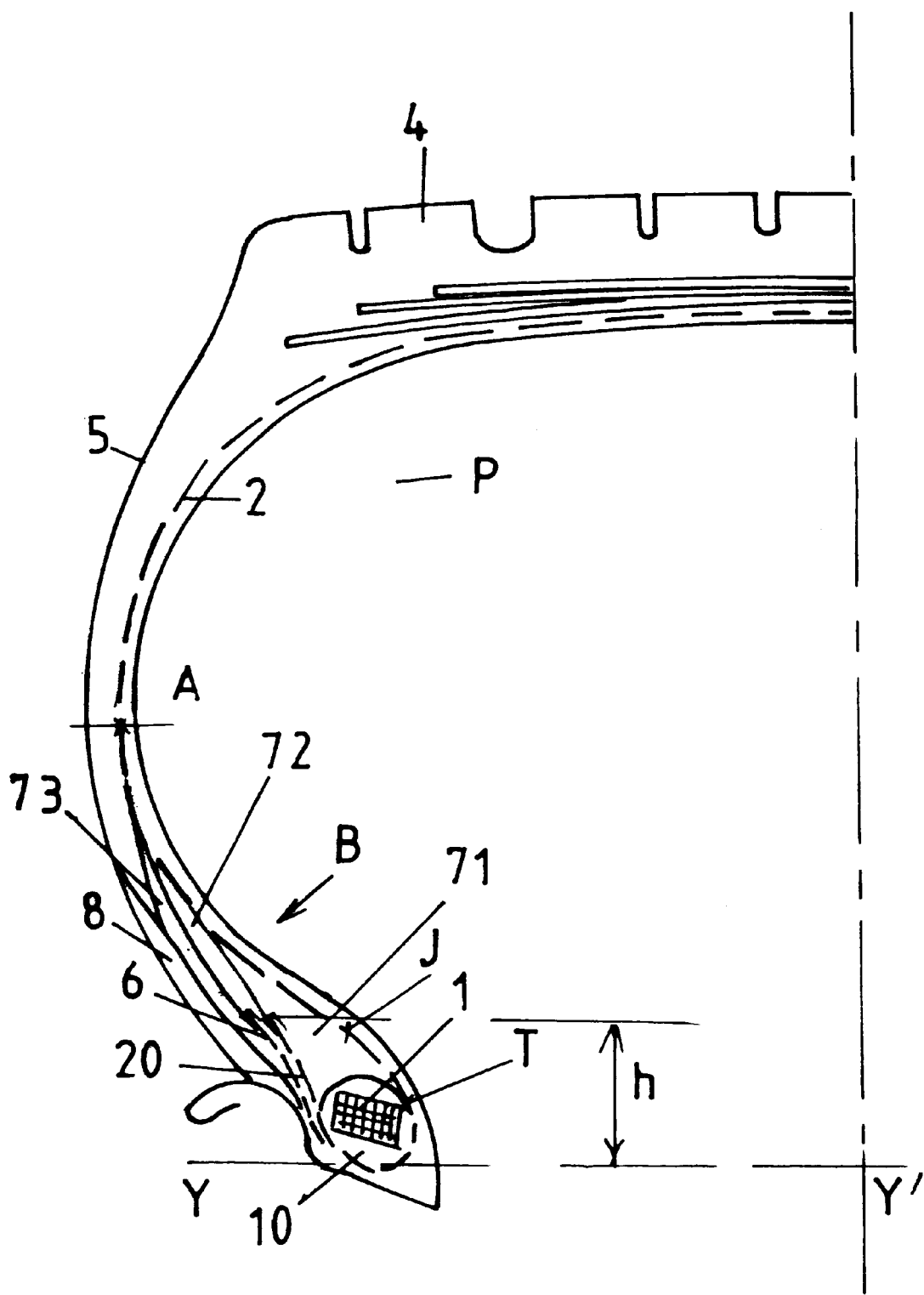
FIG. 1 is a diagram of a tire structure known from the prior art.

The tire P of the prior art, shown in FIG. 1, is a tire of dimension 205/75 R 17.5, intended to be mounted on a rim comprising rim seats inclined at 15°. Said tire comprises a tread 4 joined to two beads B by means of two sidewalls 5. Each bead B is reinforced by a bead wire 1 formed by winding a cord of quadrilateral section on a suitable form until a plurality of radially juxtaposed rows of cords is obtained. Around said bead wire 1 there is anchored a carcass reinforcement 2, composed of a single ply of aromatic polyamide cables. The carcass reinforcement 2, viewed in meridian section, has a meridian profile, between the point A of greatest axial width and the point of tangency T of said profile with the virtually circular coating layer 10 of the bead wire 1 (it is said to be virtually circular because the coating layer practically never has a perfectly circular transverse shape), having two curvatures: the profile is convex from point A to the point of inflection J located radially above the bead wire, and is concave from said point of inflection to the point of tangency T. The carcass reinforcement 2 is anchored by an upturn 20 around the layer 10 of rubber mix which covers the bead wire 1, the radial distance h between the radially upper end of said upturn 20 and the straight line YY' (parallel to the axis of rotation and defining the nominal diameter of the bead which, in the present case, is also that of the rim) and being equal, in the example in question of the tire of dimension 205/75 R 17.5, to 25 mm. Between the carcass reinforcement 2 and its upturn 20, radially above the bead wire 1, there is arranged a bead filler 71 of rubber mix of a generally high Shore hardness. Axially to the outside of the upturn 20 there is a reinforcement ply 6 formed of inextensible metal cables slightly oriented relative to the circumferential direction, and the radially upper end of which is farther from the axis of rotation than the upper end of the upturn 20 of the carcass reinforcement 2. Said ply 6 is firstly separated from the carcass reinforcement 2 and the bead filler 71 by a second fill-in filler 72 and secondly separated from the protective rubber mix 8, which surrounds the bead, by a third filler 73.

Figure 2:
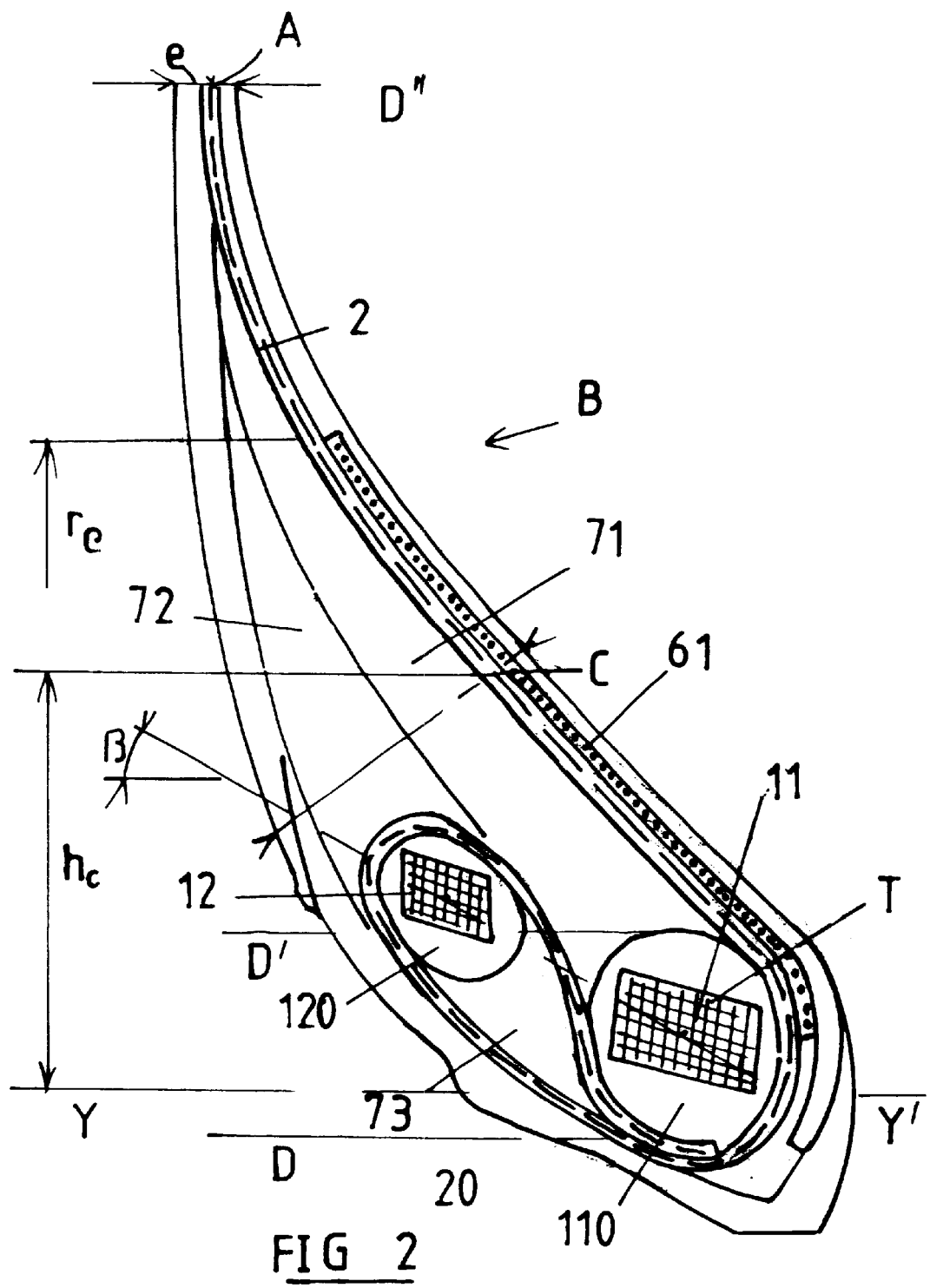
FIG. 2 is a diagram, in an enlarged view, of a first variant of a bead according to the invention, in its normal version.

The bead B of the tire of dimension 205/75 R17.5, which is in accordance with the invention and is shown in FIG. 2, is reinforced by two bead wires 11 and 12, each of said bead wires having rectangular cords, that is to say, formed by winding a cord of rectangular section on a suitable form until a plurality of radially juxtaposed rows of cords is obtained, being coated in a rubber mix 110, 120 of a high modulus of elongation. The straight line joining the two centers of gravity of the cross-sections of bead wires 11 and 12 forms with the axis of rotation an angle $\beta$ which is open axially and radially towards the outside, of 26°. The carcass reinforcement 2 is formed, in the case described, of a single ply 2 of aromatic polyamide, and it is anchored by means of the two bead wires 11 and 12. The meridian profile of said reinforcement 2 is, as defined above, tangent at T to the virtually circular coating layer 110 of the first, axially and radially innermost, bead wire 11, then winds about said bead wire 11, passing radially from the outside to the inside and axially from the inside to the outside, then extending as far as the second bead wire 12, and winding around said bead wire 12 radially from the inside to the outside and axially from the outside to the inside, and finally radially from the outside to the inside to rejoin the first, axially outermost, bead wire 11 and to have its end radially beneath said first bead wire 11. The arrangement of the rubber fillers between the various reinforcement elements is then modified as follows: axially and radially to the outside of the axially inner bead wire 11 there is a first filler 71, axially and radially to the outside of the axially outer bead wire there is a second filler 72, whereas, radially and axially to the inside of the axially outer bead wire 12 there is a third filler 73.

Said arrangement may be modified in that the complex formed by the axially outer bead wire 12 surrounded by the coating 120 and the filler 73 may be replaced by a single rubber filler 73. It is then advantageous for the secant modulus of elasticity under tension of said single filler to be high: measured at 1% relative elongation, this modulus is preferably at least equal to 10 MPa.

The meridian profile of the carcass reinforcement 2 is continuously convex between the point A of greatest axial width and the point of tangency T to the coating 110 of the axially innermost bead wire 11 without having a point of inflection J. The convexity of said profile, of single radius R, the center of curvature of which is located on the straight line D" of greatest axial width, is such that the thickness a of the bead B, measured on a line perpendicular to said meridian profile at a point C of height he of 34 mm, measured relative to the base of the bead YY', is equal to 19 mm, or 2.5 times the thickness a of the sidewall measured on the straight line D" of greatest axial width, whereas the thickness, measured under the same conditions, of the bead of FIG. 1 is equal to 22 mm.

The bead is also characterized by the presence of a reinforcement armature 6 composed of a bead reinforcement ply 61, formed of circumferential metal elements made of steel which are cut metal 19×28 cables, the length of said elements or lengths of cables being equal to one quarter of the circumferential length of said ply 61, measured at its radius of lay before shaping of the non-vulcanized carcass reinforcement blank, said ply 61 being placed axially to the inside of the carcass reinforcement 2 and non-axially to the outside of the upturn 20 of the carcass reinforcement 2.

The spaces between ends of elements before shaping of the blank are of low amplitude (3 mm) and are circumferentially off set from each other.

The radially lower end of the ply 61 is distant from the axis of rotation of the tire by an amount equal to 227 mm, that is to say, between the distance of 223 mm between the axis of rotation and the straight line D passing through that point of the virtually circular coating layer 110 of the first anchoring bead wire 10 which is closest to the axis of rotation and the distance of 233 mm between the axis of rotation and the straight line D' passing through that point of the coating layer 110 which is farthest from said axis of rotation.

As for the radially upper end, it is located radially, in the case described, at a distance $r_e$ from the axis of rotation equal to 255 mm, which quantity lies between a quantity of 265 mm, which is equal to half the total of 260 mm of the respective distances of the straight lines D and D' from the axis of rotation (297+223)/2, the straight line D" of greatest axial width passing through the point A being 297 mm from the axis of rotation), increased by half the radial distance of 5 mm between the straight lines D and D' (233−223)/2, and a quantity of 255 mm, which is equal to half the total 260 mm of the respective distances of the straight lines D and D" from the axis of rotation, reduced by half the radial distance of 5 mm between the straight lines D and D'.

Figure 3:
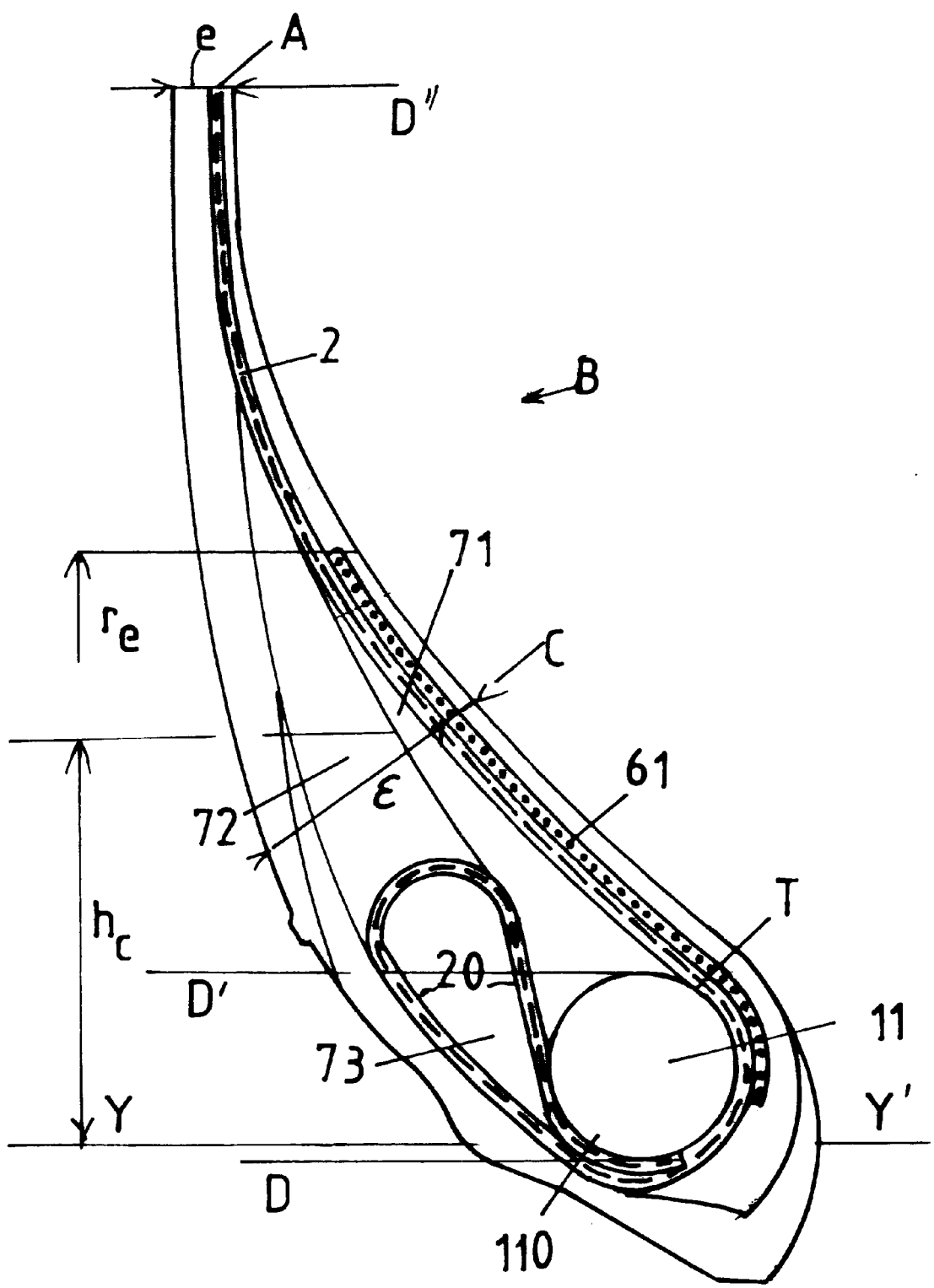
FIG. 3 shows a diagram of a second variant of a bead according to the invention, the bead wires being braided bead wires, and the bead being thinned.

The bead B shown in FIG. 3, has, viewed in meridian section, a meridian profile of the carcass reinforcement 2 which, as in the case of FIG. 2, between the point A of greatest axial width and the point of tangency T of said profile with the circle circumscribed on the coating layer 110 of the first bead wire 11, is continuously convex, without a point of inflection J in the bead region. Said bead of FIG. 3 differs from that of FIG. 2, firstly by the fact that the first bead wire 11, which is axially and radially farthest to the inside, is a bead wire of "braided" type which, having a cross-sectional area equal to the area of the section of a bead wire having rectangular wires, means that overall less space is taken up, and secondly by the fact that the complex formed by the axially outer bead wire 12 and the rubber profiled member 73 is replaced by a single filler 73, which accentuates the thinning of the bead and the reduction in weight of the tire. The above arrangement makes it possible to obtain a bead thickness $\epsilon$, measured on a line perpendicular to said meridian profile at a point C of height $h_c$, equal to 30 mm, measured relative to the base of the bead YY', equal to 17 mm, or 2.2 times the thickness of the sidewall measured on the straight line D" of greatest axial width. The bead reinforcement ply 6, composed of circumferential elements, as in the case shown in FIG. 2, is placed axially to the inside of the carcass reinforcement 2 and non-axially to the outside of the upturn 20 of the carcass reinforcement 2.

Figure 4:
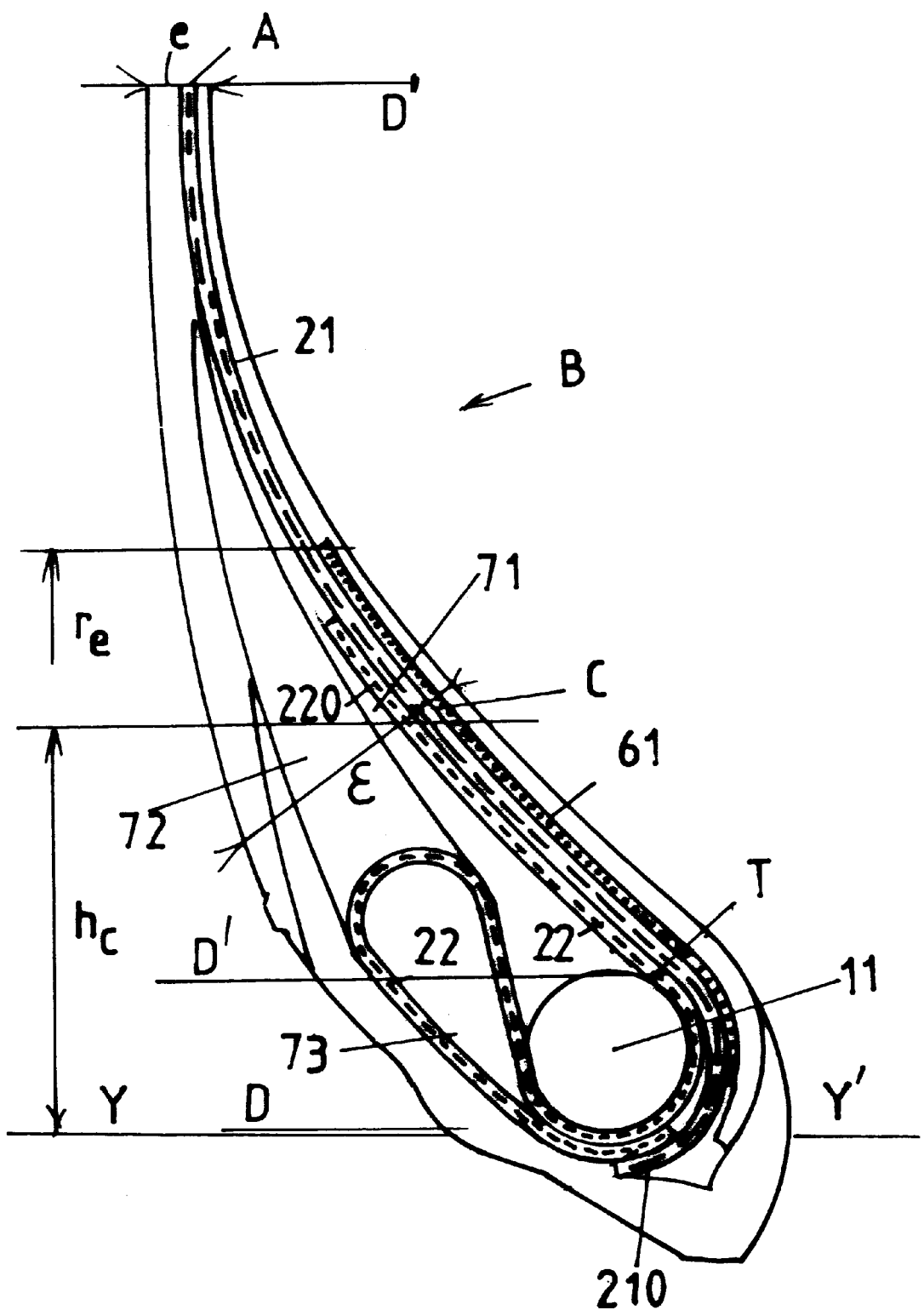
FIG. 4 shows a diagram of a variant of the invention with a carcass reinforcement in three parts.

The bead B of FIG. 4 differs from that of FIG. 3 solely by the fact that the carcass reinforcement 2 of the tire in question is composed of a first part 21 formed of metal cables, and of two parts 22 formed of textile cables. The first part 21 has firstly a meridian profile trace which passes beneath the crown (not shown) and within the sidewalls, and secondly two edges 210 which are partially turned up about the complex formed by the anchoring bead wire 11 and the profiled member 73.

Each second part has an axially inner edge 220 which, with an edge 210 of the first part, has a common overlap length, and such that the radially upper end of said edge is radially to the inside of the radially upper end of the additional reinforcement ply 61. Said second part is turned up about the bead wire 11, then wound around the sole filler 73 to have a second edge located radially beneath the bead wire 11.

The tires $P_{AB}$ of the dimension described, comprising two-wire beads of the "braided" type, a thinned carcass reinforcement profile and an additional bead reinforcement ply having circumferential elements and located axially to the inside of the carcass reinforcement, were compared:

with conventional tires $P_T$ that is to say, ones comprising beads of conventional thickness, comprising only a single bead wire having rectangular wires and in which the bead reinforcement ply is a ply of continuous metal cables oriented at 22° to the circumferential direction and arranged axially to the outside of the carcass reinforcement upturn, as shown in FIG. 1 of the drawings, and with tires $P_A$, which are identical to the tires $P_T$, but with beads having two anchoring bead wires, with tires $P_B$, which are identical to the tires $P_T$, but have thinned beads, a bead wire of "braided" type and an additional bead reinforcement armature, having circumferential elements and located axially to the inside of the carcass reinforcement.

The comparison was made based on two quality criteria which are fundamental to the endurance of tire beads: endurance under excess load, and endurance on a hot rim. Under the same rolling conditions for all the tires tested, the conventional tires $P_T$ on average (2 tested per category) covered 36,000 km traveling under excess load and 5,100 km traveling with a hot rim. The tires $P_A$ with beads having two bead wires covered, in the same two types of travel respectively, 27,000 km and 21,000 km, which represents a substantial gain in endurance on a hot rim. The tires $P_B$ under the same conditions of travel in the two tests covered 72,000 km and 5,900 km, whereas the tires $P_{AB}$ covered 93,000 km and 31,000 km, which represents considerable progress. Tires $P_c$ comprising beads of normal thickness, two anchoring bead wires within each bead and an additional bead reinforcement armature, having circumferential elements and located axially to the inside of the carcass reinforcement, covered the following mileages: 61000 km traveling with excess load and 29,000 km traveling on a hot rim.

Said results very clearly show the powerful effect of the presence of two anchoring bead wires within a bead as regards endurance on a hot rim. On the other hand, when traveling with an excess load, said presence is far from beneficial, but rather is harmful in the case of a normally-constituted tire with normal thicknesses and normal bead reinforcement armatures. Said harmful influence is unexpectedly canceled out in the case of tires in which the conventional bead reinforcement armature on the carcass reinforcement upturn is replaced with a reinforcement armature having circumferential elements and located axially to the inside of the carcass reinforcement, and, even more unexpectedly, transformed into a beneficial effect in the case of tires comprising thinned beads combined with the presence of the additional reinforcement armature having circumferential elements within the carcass reinforcement, whereas the yield in terms of traveling on a hot rim is improved further, which makes the combination $P_{AB}$, one of particularly high performance.

I claim:

1. A tire having an H/S form ratio of less than 0.8, a crown reinforcement, and sidewalls, the tire intended to be fitted on a vehicle bearing heavy loads, said tire comprising at least one radial carcass reinforcement, formed of at least one ply of inextensible reinforcement elements, which is anchored within each bead B to at least two bead wires which are close to each other, which is turned up about the first bead wire, having a virtually circular coating layer, and then wound around the second bead wire to form an upturn, characterized in that, viewed in meridian section, an additional reinforcement armature, formed of at least one ply of circumferential reinforcement elements, is placed along the carcass reinforcement, at least axially to the inside, said reinforcement armature having firstly its radially lower end radially beneath a straight line D' which is parallel to the axis of rotation and passes through that point of the coating layer of the first anchoring bead wire which is radially farthest from the axis of rotation, but above a straight line D which is parallel to the axis of rotation and passes through that point of the coating layer of the first anchoring bead wire which is radially closest to the axis of rotation, and secondly its radially upper end of the additional reinforcement armature located at a radial distance from the straight line D which lies between a quantity equal to half the radial distance between straight lines D and D" increased by half the radial distance between the straight lines D and D' and a quantity equal to half the radial distance between the straight lines D and D" reduced by half the radial distance between the straight lines D and D', the straight line D" being the straight line at the point of greatest axial width.

2. A tire according to claim 1, characterized in that the meridian profile of the at least one carcass reinforcement, viewed in meridian section, has a trace, between the point A of greatest axial width and the point of tangency T with the virtually circular coating layer of the first anchoring bead wire which is convex and circular over its entire length, the center of curvature being located on the straight line D" at the point of greatest axial width, such that the thickness s of the bead B, measured on a line perpendicular to said meridian profile at a point C of height $h_c$ of between 30 and 40 mm and measured relative to the base of the bead YY',
is between 2 and 2.5 times the thickness e of the sidewall measured on the straight line D" at the point of greatest axial width.

3. A tire according to claim 1, characterized in that in the region of the bead B, the trace of the meridian profile of said at least one carcass reinforcement changes curvature to become rectilinear or concave at the point of tangency T with the virtually circular coating layer of the first anchoring bead wire.

4. A tire according to claim 3, characterized in that the meridian profile of the at least one carcass reinforcement, which is tangent at T to the coating of the first, axially and radially innermost, bead wire, then winds about said first bead wire passing radially from the outside to the inside, and axially from the inside to the outside, then extending axially towards the outside as far as the second bead wire, winding around said second bead wire radially from the inside to the outside and axially from the outside to the inside, to form an upturn extending radially from the outside to the inside to rejoin the first, axially inner, bead wire.

5. A tire according to claim 3, characterized in that the end of the upturn of the at least one carcass reinforcement is located radially beneath the axially and radially innermost bead wire.

6. A tire according to claim 3, characterized in that the straight line joining the two centers of gravity of the cross-sections of bead wires forms with the axis of rotation an angle β which is open axially and radially towards the outside, of between 20° and 60°.

7. A tire according to claim 3, characterized in that the circumferential reinforcement elements of the reinforcement armature for the bead B are metal made of steel.

8. A tire according to claim 3, characterized in that the first and second anchoring bead wires are braided bead wires.

9. A tire according to claim 3, wherein said carcass reinforcement is assembled as a non-vulcanized blank on a building drum prior to shaping into a torus, characterized in that the reinforcement elements of the reinforcement armature for the bead B are lengths or assemblies of lengths of metal cables, of a circumferential length of between 0.2 and 0.4 times the circumferential length of the reinforcement armature, as measured at its radius of lay on the building drum before shaping of the non-vulcanized carcass reinforcement blank.

10. A tire according to claim 3, characterized in that the at least one carcass reinforcement is formed of reinforcement elements of textile material.

11. A tire according to claim 3, characterized in that the at least one carcass reinforcement is formed of three parts: a first part of metal reinforcement elements passing at least beneath the crown reinforcement and into the sidewalls of said tire, and two other parts, formed of textile reinforcement elements, which are turned up and wound around the first and second anchoring bead wires of each bead B, each edge of the metal part having, with each axially inner edge of a textile part, a common overlap length, at least located in the region in which the additional armature of circumferential reinforcement elements is located.

* * * * *

UNITED STATES PATENT AND TRADEMARK OFFICE
CERTIFICATE OF CORRECTION

PATENT NO. : 6,463,975 B1  
DATED : October 15, 2002  
INVENTOR(S) : Auxerre, Pascal It is certified that error appears in the above-identified patent and that said Letters Patent is hereby corrected as shown below:

Column 2,
Line 42, "HIS" should read -- H/S --

Column 3,
Line 6, "D' ," should read -- D', --

Column 4,
Line 57, "D" , of" should read -- D" at the point of --

Column 5,
Line 51, "thinned;" should read -- thinned; and --

Column 7,
Line 7, "he" should read -- $h_c$ --
Line 25, "off set" should read -- offset --

Column 8,
Line 65, "61000 km" should read -- 61,000 km --

Signed and Sealed this

Twenty-ninth Day of April, 2003

JAMES E. ROGAN
*Director of the United States Patent and Trademark Office*